United States Patent
Jha et al.

(10) Patent No.: US 9,864,830 B1
(45) Date of Patent: Jan. 9, 2018

(54) METHOD AND APPARATUS FOR PLACEMENT AND ROUTING OF CIRCUIT DESIGNS

(71) Applicant: Xilinx, Inc., San Jose, CA (US)

(72) Inventors: Pradip K. Jha, Cupertino, CA (US);
Atul Srinivasan, Woodside, CA (US);
Steven Banks, Sunnyvale, CA (US);
Nicholas A. Mezei, Thornton, CO (US)

(73) Assignee: XILINX, INC., San Jose, CA (US)

( * ) Notice: Subject to any disclaimer, the term of this patent is extended or adjusted under 35 U.S.C. 154(b) by 79 days.

(21) Appl. No.: 15/040,814

(22) Filed: Feb. 10, 2016

(51) Int. Cl.
*G06F 17/50* (2006.01)

(52) U.S. Cl.
CPC ...... *G06F 17/5081* (2013.01); *G06F 17/5072* (2013.01); *G06F 17/5077* (2013.01)

(58) Field of Classification Search
CPC .................................................. G06F 17/5081
USPC ........................................................ 716/113
See application file for complete search history.

(56) References Cited

U.S. PATENT DOCUMENTS

| 7,013,438 | B1* | 3/2006 | Saldanha | G06F 17/505 716/104 |
| 2004/0117744 | A1* | 6/2004 | Nation | G06F 17/5045 716/104 |
| 2007/0079273 | A1* | 4/2007 | Lahner | G06F 17/5072 716/113 |

* cited by examiner

*Primary Examiner* — Suchin Parihar
(74) *Attorney, Agent, or Firm* — LeRoy D. Maunu

(57) ABSTRACT

Methods and systems are disclosed for placement and routing of a circuit design. A set of timing constraints is retrieved that specifies timing for objects included in a first shell circuit design configured to provide an interface for communication between the circuit design and the set of dedicated hardware resources on an IC. One or more objects of the first shell circuit design that do not affect timing of the circuit design are identified and removed from the first shell circuit design to produce a second shell circuit design. The circuit design is placed and routed according to timing constraints specified for objects of the first shell circuit design that are included in the second shell circuit design. The placed and routed circuit design is stored in a memory circuit.

20 Claims, 6 Drawing Sheets

METHOD AND APPARATUS FOR PLACEMENT AND ROUTING OF CIRCUIT DESIGNS

TECHNICAL FIELD

The disclosure relates to electronic circuit design and, more particularly, to timing analysis for circuit designs implemented with integrated circuits.

BACKGROUND

Programmable ICs are devices that can be programmed to perform specified logic functions. One type of programmable IC, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a circuit design using programmable elements that can include, for example, function generators, registers, arithmetic logic, and so forth. The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Some programmable ICs include one or more embedded processors that are capable of executing program code. A processor can be fabricated as part of the same die that includes the programmable logic circuitry and the programmable interconnect circuitry, which may also be referred to collectively as the "programmable circuitry" of the IC. It should be appreciated that execution of program code within a processor is distinguishable from "programming" or "configuring" the programmable circuitry that may be available on an IC. The act of programming or configuring the programmable circuitry of an IC results in the implementation of different physical circuitry as specified by the configuration data within the programmable circuitry.

A conventional design process for implementing a circuit on a programmable IC begins with the creation of a circuit design. The circuit design specifies the function of a circuit at a schematic or logic level and may be represented using various hardware description languages (e.g., VHDL, ABEL, or Verilog) or schematic capture programs. The design is synthesized to produce a logical network list ("netlist"), and the synthesized design is mapped onto primitive components within the target device (e.g., programmable resources of a programmable IC).

Following mapping, placement of the components of the synthesized and mapped design is performed for the target device. During placement, each mapped component of the design is assigned to a physical position on the device. The placement tool attempts to place connected design objects in close physical proximity to one another in order to conserve space and increase the probability that signals can be routed in a manner that satisfies timing requirements of the circuit design.

Specified connections between components of the design are routed within the target device for the placed components. The routing process specifies physical wiring resources that will be used to conduct signals between pins of placed components of the design. For each connection specified in the design, the routing process allocates wire resources necessary to complete the connection. As used herein, the selection and assignment of wire resources in connecting a port of one component to the port of another component is referred to as routing a net.

SUMMARY

Methods are disclosed for placement and routing of a circuit design. In an example implementation, a set of timing constraints is retrieved that specifies timing for objects included in a first shell circuit design configured to provide an interface for communication between the circuit design and the set of dedicated hardware resources on an IC. The circuit design is configured to interact with a set of dedicated hardware resources of the IC via the first shell circuit design. One or more objects of the first shell circuit design that do not affect timing of the circuit design are identified and removed from the first shell circuit design to produce a second shell circuit design. The circuit design is placed and routed according to timing constraints specified for objects of the first shell circuit design that are included in the second shell circuit design. The placed and routed circuit design is stored in a memory circuit.

Systems are also disclosed for placement and routing of a circuit design. In an example implementation, the system includes a processor circuit and a memory circuit coupled to the processor. The memory circuit stores a set of instructions that, when executed by the processor, causes the processor to retrieve a set of timing constraints. The timing constraints specify timing for objects included in a first shell circuit design that is configured to provide an interface for communication between the circuit design and the set of dedicated hardware resources on an IC. The circuit design is configured to interact with a set of dedicated hardware resources of the IC via the first shell circuit design. The instructions cause the processor to identify and remove one or more objects of the first shell circuit design that do not affect timing of the circuit design to produce a second shell circuit design. The instructions further cause the processor to place and route the circuit design according to timing constraints specified for objects of the first shell circuit design that are included in the second shell circuit design. The processor stores the placed and routed circuit design in the memory circuit.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which.

DETAILED DESCRIPTION

Figure 1:
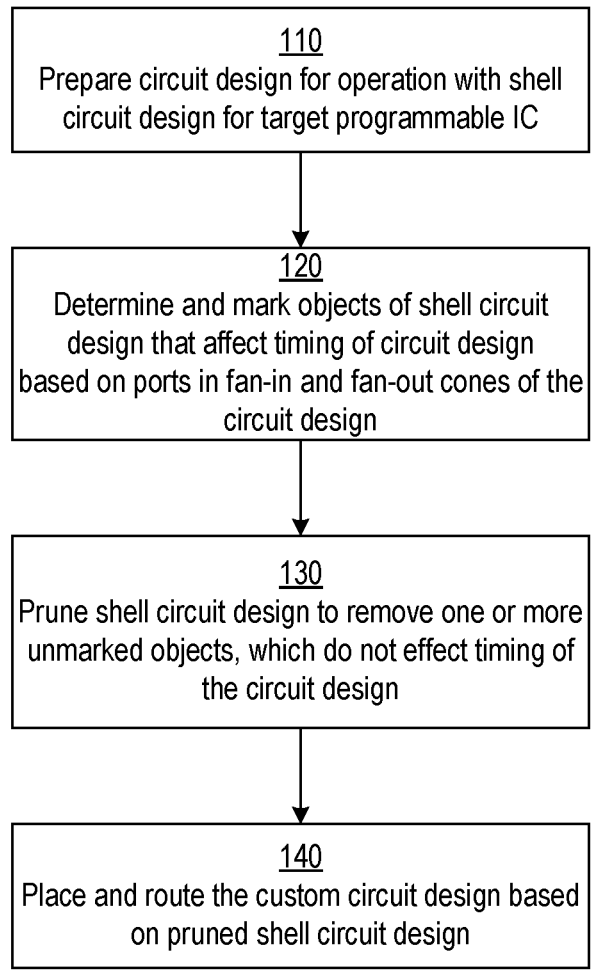
FIG. 1 shows an example process for placement and routing of a custom circuit design configured to operate on a programmable IC alongside a shell circuit design.

In some approaches, development of circuit designs may be expedited by use of a platform-specific shell circuit design. The shell circuit design may include circuits configured to provide an interface between a custom circuit design provided by a developer and dedicated hardware circuits on a particular programmable IC to be used to implement the custom circuit design, Dedicated hardware circuits may include, for example, general purpose processors, DMA engines, clocking circuits, power management circuits, Fourier transforms, and/or external communication circuits (e.g., PCIe, Ethernet, USB). A shell circuit design for a particular programmable IC may be designed, placed, routed, and optimized in advance by an experienced engineer and distributed by a vendor for use by developers. In placing and routing the shell circuit design, one or more regions of programmable hardware resources are reserved for implementation of the custom circuit design. As an illustrative example, a shell circuit design may be utilized to expedite development of an HLL design which utilizes hardware accelerated functions. For instance, the shell circuit design may specify circuits to communicate data between HLL code executing on a processor of the programmable IC and a custom circuit design implementing a set of hardware accelerated functions in programmable hardware resources of the programmable IC.

In addition to reducing the burden of development, use of a shell circuit design may also reduce processing time required for placement and routing of the custom circuit design. Conventional design tools apply timing constraints on a global level but are unable to accurately determine which portions of global design constraints are attributable to module instances of a custom circuit design. Due to inaccuracies of timing constraints applied to the module instances in the custom circuit design, numerous iterations of placement, routing, and optimization may be required before timing requirements of all circuits are met. To accelerate placement and routing processes, the shell circuit design may be placed, routed, and optimized in advance for implementation by programmable resources of a target programmable IC. As previously indicated, a region of programmable resources is reserved for implementation of a custom circuit design. For ease of reference, the region reserved for implementation of the custom circuit design may be referred to as the reconfigurable region. Timing data specified for the placed and routed shell circuit design may be utilized to improve accuracy of timing and/or placement constraints used for initial placement and routing of the custom circuit design. As a result of improved accuracy, a successful placement and routing of the custom circuit design that satisfies all timing requirements may be achieved in fewer iterations.

Some approaches ensure accuracy of initial timing and placement constraints for the custom circuit design by taking timing data of all circuits of the placed and routed shell circuit design into consideration. However, the custom circuit design may not utilize various circuits included in the shell circuit design. Consideration of timing data for unused circuits of the shell circuit design increases computation resources (e.g., memory and/or processing time) required for placement and routing.

Various methods and systems are disclosed for placement and routing of a custom circuit design using fewer computing resources in comparison to previous approaches. In an example implementation, a processor circuit retrieves a set of timing constraints that specifies timing for objects included in a first shell circuit design. The shell circuit design specifies an interface for communication between an implementation of the custom circuit design and the set of dedicated hardware resources on a target programmable IC.

Prior to placement and routing of the custom circuit design, one or more objects of the first shell circuit design that do not affect timing of the circuit design are identified and removed from the first shell circuit design to produce a second shell circuit design. For ease of reference, the removal of objects from the shell circuit design may be referred to as pruning of the shell circuit design. The custom circuit design is then placed and routed based on timing constraints specified for objects included in the smaller second shell circuit design. Timing specified for objects of the shell circuit design that are not included in the second shell circuit design are not considered in the placement and routing of the customized design. As a result, fewer computing resources are required for the placement and routing of the custom circuit design in comparison to previous approaches.

Various implementations may be adapted for used with various IC architectures including programmable resources and/or processing circuits. For ease of explanation, the disclosed examples are primarily discussed with reference to a programmable IC having a set of programmable resources for implementation of shell and custom circuit designs. For ease of explanation, the disclosed examples are primarily discussed with reference to a shell circuit design configured to provide an interface for a customized design in a single reconfigurable region. However, the examples may be adapted for use with shell circuit designs having multiple reconfigurable regions for implementing modules of a custom circuit design.

Turning now to the figures, FIG. 1 shows an example process for placement and routing of a custom circuit design configured to operate on a programmable IC alongside a shell circuit design. At block 110, the custom circuit design is prepared for combining with a shell circuit design specified for a target programmable IC. Preparation of the custom circuit design may include, for example, identifying input and output ports of the circuit design and/or mapping input and output ports of the custom circuit design to a set of ports in the shell circuit design. At block 120, objects of the shell circuit design that affect timing of the custom circuit design are identified and marked, for example, based on input and output ports in the custom circuit design. At block 130, the shell circuit design is pruned to remove one or more unmarked objects that do not affect operation specified by the custom circuit design. In some implementations, pruning may be performed directly on the shell circuit design. In some other implementations, a copy of the shell circuit design may be pruned, thereby allowing the original shell circuit design to be restored after the custom circuit design has been placed and routed for implementation in the reconfigurable region. At block 140, the custom circuit design is placed and routed based on the smaller shell circuit design.

Various processes may be employed for marking and pruning objects of the static circuit design. The marking and pruning is performed to reduce the number of objects in the static circuit design while preserving objects necessary to retain the same timing from the perspective of the custom design. Objects that are marked may include, for example, module instances, ports, and/or nets in the shell circuit design. As described with reference to FIG. 1, in some implementations, objects of the shell circuit design that affect timing of the custom circuit design are marked for preservation when pruning the shell circuit design. Conversely, in some implementations, objects that do not affect timing of the custom circuit design may be marked for removal in the pruning step. For ease of explanation, the example processes are primarily described with reference to marking of objects that affect timing of the custom circuit design for preservation when pruning the shell circuit design. In some implementations, the objects of the shell circuit design may be marked with different properties to specify whether or not timing information should be retained along with an object to be preserved. For instance, objects may be marked with a property "KEEP_PLATFORM" to indicate that the object should be retained along with timing delay information or marked with a "KEEP_PLATFORM_TC" to indicate that the object should be retained but that timing delay information for the object is not required.

Figure 2:
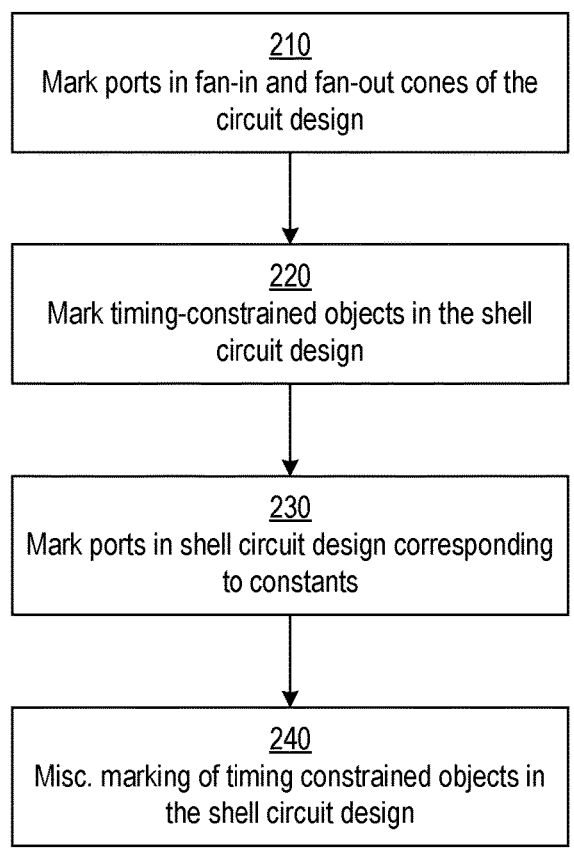
FIG. 2 shows an example process for marking objects of a shell circuit design that affect timing of a custom circuit design.

FIG. 2 shows an example process for marking objects of a shell circuit design that affect timing of a custom circuit design. At block 210, ports in the fan-in or fan-out cones of the custom circuit design are marked. Starting with the input ports of the custom circuit design, the process may perform a backward breadth first search (BFS) to identify all ports in the fan-in cones to the input ports of the custom circuit design. Each port encountered in the BFS (including the originating input port of the custom circuit design) is marked with the KEEP_PLATFORM property to ensure that the port is retained with accurate timing delays. The BFS of the fan-in cone of an input port may follow data signal paths as well as clock networks that are used to clock circuits in the fan-in. For example, a shell circuit design may include a flip-flop having an output (Q) connected to an input port of the custom design. The BFS of the input port will follow a net connected to that input port and driven by the flop output (Q) and also a net connected to a clock input (C) of the flip-flop. Similarly, the process may perform a forward BFS of the output ports of the custom circuit design, marking all ports encountered in the search. When a clocked circuit is encountered in the forward BFS of the fan-out cone, a backward BFS from the clock input port of the circuit is also performed.

After identifying and marking the fan-in and fan-out cones, timing constrained objects in the shell circuit design are marked for preservation at block 220. Marking of timing constrained objects for preservation ensures that the original timing constraints can be read and attached to valid objects after pruning the shell circuit design. Since some timing constrained portions of the shell circuit design may not interact with the custom circuit design, timing delay information for these objects may not be required for placement and routing of the custom circuit design. Accordingly, in some implementations, the process may mark timing constrained objects with the previously described KEEP_PLATFORM_TC property. Timing constrained object identification may be performed separately from other marking processes, such as marking of objects in fan-in and fan-out cones. A timing constrained object that is already marked KEEP_PLATFORM at block 210, may additionally be marked with the KEEP_PLATFORM_TC property at block 220. When the shell circuit design is pruned, the more restrictive KEEP_PLATFORM property will ensure that timing delay information is retained.

In one example implementation, each port of the shell circuit design having a timing constraint is marked. For a module instance having a timing constraint, the module instance is marked along with ports of the module instance. Timing constrained nets are marked along with ports connected to the nets. As an illustrative example, a 'set_max_delay 10–to [get_ports ff1/d]' constraint would result in the port 'ff1/d' being marked. As a result of marking the port, the net connection to that port is automatically preserved. In the case of the 'set_max_delay', the net connection ensures that 'ff1/d' is retained in the shell circuit design.

The process may utilize a specialized marking step for 'create_generated_clock' constraints. A generated clock can implicitly or explicitly reference a master clock, and can define a source pin on which the generated clock's waveform will be derived from the waveform of the master. To avoid issues with missing generated clock source paths when reading back the shell circuit design, the process may mark clock circuitry in between a master clock's definition point(s) and the generated clock's source pin. Such clock circuitry may be marked, for example, via a backward BFS starting at the generated clock source pin.

In some implementations, all timing constrained objects in the shell circuit design are marked for preservation. In some other implementations, only timing constrained objects that impact or interact with the custom circuit design are marked for preservation. Removal of timing constrained objects that do not affect the custom circuit design in the pruning step further reduces computing resource requirements for placing and routing of the custom circuit design.

In some scenarios, timing analysis may be sensitive to values of constants present and/or propagated in the circuit. For example, if a logic AND gate has a first input port driven by a constant logic 0, the output of the AND gate will be constant logic 0 regardless of the signal propagated to a second input port of the AND gate. Accordingly, circuits that provide the constant must be preserved to retain equivalent timing in the shell circuit design. Moreover, timing of the second input port may be ignored.

Constant propagation may be performed separately from pure timing arrival/required propagation. Accordingly, the marking of objects in the input and output cones at block 210 may not mark portions of the shell circuit design for constants that affect the final timing paths. In this example, ports in the shell circuit design corresponding to constants are marked at block 230. Such ports may include, for example ports driven directly by vcc/gnd, driven by constant outputs of upstream cells (e.g. a constant LUT output), or designated as constant in the shell circuit design (e.g., set_case_analysis sdc constraint, etc.). Constant ports may be identified by inspecting module instances that have at least one port that is marked. For each module instance that is inspected, ports of the module instance are examined to determine whether or not the port is constant. After identifying a constant port, a backward BFS is performed to mark ports in the fan-in cone of the constant port.

In some implementations, after marking a constant port of a module instance, the process may examine other marked ports of the module, to determine if the ports are made irrelevant. For example, as previously described, an input port of an AND gate may be irrelevant if another input port of the AND gate is a constant logic 0. If a marked port is determined to be irrelevant, the marked property is removed from the port.

In some implementations, various additional objects of the shell circuit design that are required to maintain equivalent timing are also marked for preservation at block 240. For example, feedback paths of phase-locked loops or mixed-mode clock managers may not be encountered in the marking performed at blocks 210, 220, and 230. In an example implementation, the process may identify module instances having at least one pin already marked and a feedback path. Each object in the feedback path may then be marked, e.g., with the KEEP_PLATFORM property. As another example, the process may mark objects to ensure that any net having at least one leaf level load also has a leaf level driver. The process may traverse all nets having at least one pin marked, and mark a leaf level driver if a leaf level load is connected.

Figure 3:
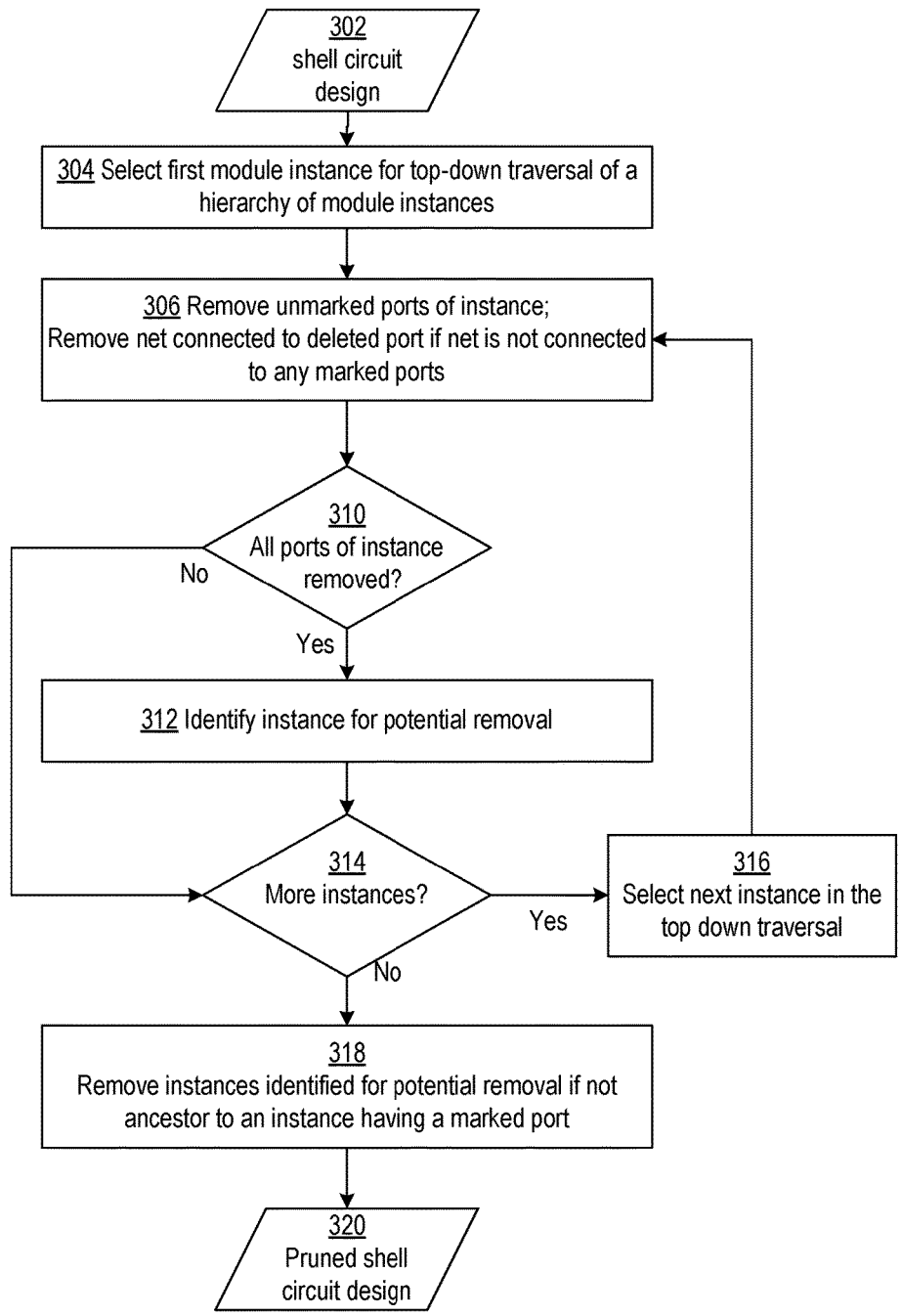
FIG. 3 shows an example process for pruning a shell circuit design.

FIG. 3 shows an example process for pruning a shell circuit design. In this example, the pruning process is performed while traversing a hierarchy of module instances in the shell circuit design 302. At block 304, a first module instance is selected for a top-down traversal of the hierarchy. At block 306, unmarked ports of the selected module instance are removed. A net connected to the deleted port is also removed at block 306 if the net is not connected to any marked ports. If all ports of the module instance are removed, decision block 310 directs the process to identify the module instance as being potentially removable at block 312. Otherwise, decision block 310 directs the process to decision block 314. While there are additional module instances that have not been traversed, decision block 314 directs the process to select the next module instance at block 316. The processes performed at 306, 310, and 314 are then repeated for the selected module instance. Once there are no additional module instances in the hierarchy to be traversed, decision block 314 directs the process to block 318. At block 318, the process removes each module instance identified for potential removal if the module instance is not an ancestor to a module instance in the hierarchy that has a marked port. The resulting shell circuit design is stored as a pruned-shell circuit design 320.

As previously discussed, removal of objects from the shell circuit design reduces computing resources required for placement and routing of a custom circuit design and thereby improves runtime performance of the placement and routing process. TABLE 1 shows computing resources required for placement and routing of an example circuit design when using a full size shell circuit design and when using a smaller pruned shell circuit design.

TABLE 1

|  | P&R with full shell circuit design | P&R with pruned shell circuit design | Improvement |
|---|---|---|---|
| Runtime (minutes) | 23.0 | 4.5 | 5.1 |
| Memory (GB) | 5.38 | 3.24 | 1.7 |
| Module instances | 139677 | 15604 | 8.9 |

In this example, pruning of the shell circuit design provides an 8.9× reduction in the number of module instances in the complete design—from 139677 module instances to 15604 module instances. As a result, memory usage in the placement and routing process is reduced by a factor of 1.7 and runtime is reduced by a factor of 5.1

Figure 4:
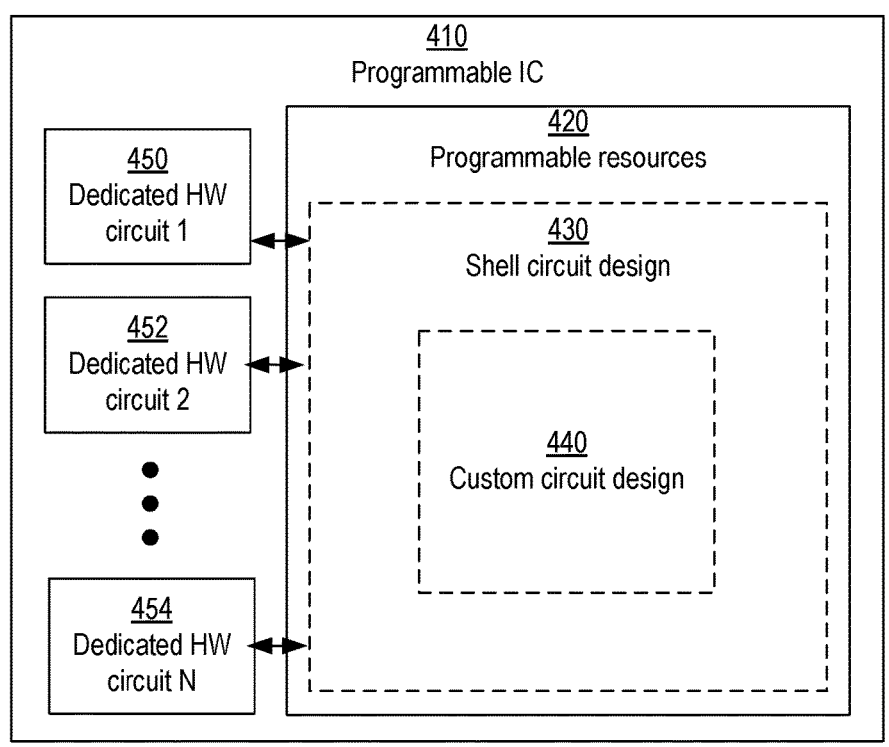
FIG. 4 shows an example programmable IC configured to implement a custom circuit design and shell circuit design, consistent with one or more implementations.

FIG. 4 shows an example programmable IC configured to implement a custom circuit design and shell circuit design, consistent with one or more implementations. In this example, the programmable IC 410 includes a set of programmable hardware resources 420 (e.g., configurable logic blocks and/or configurable routing resources) that may be programmed to implement circuits for various circuit designs. The programmable IC 410 also includes a set of dedicated hardware circuits 450, 452, and 454. As previously described, dedicated hardware circuits 450, 452, and 454 may include, for example, general purpose processors, DMA engines, clocking circuits, power management circuits, Fourier transforms, and/or external communication circuits (e.g., PCIe, Ethernet, USB).

In this example, the programmable hardware resources 420 are configured to implement a device specific shell circuit design 430 in a first portion of the programmable hardware resources and a custom circuit design 440 in a second portion of the programmable hardware resources. The custom circuit design 440 is configured to interact with one or more of the dedicated hardware circuits 450, 452, and 454 via a generic set of ports (not shown in FIG. 4) of the shell circuit design 430. The shell circuit design 430 is configured to provide an interface for communication of data between the generic set of ports available to the custom circuit design 440 and the particular dedicated hardware circuits 450, 452, and 454 on the programmable IC.

Figure 5:
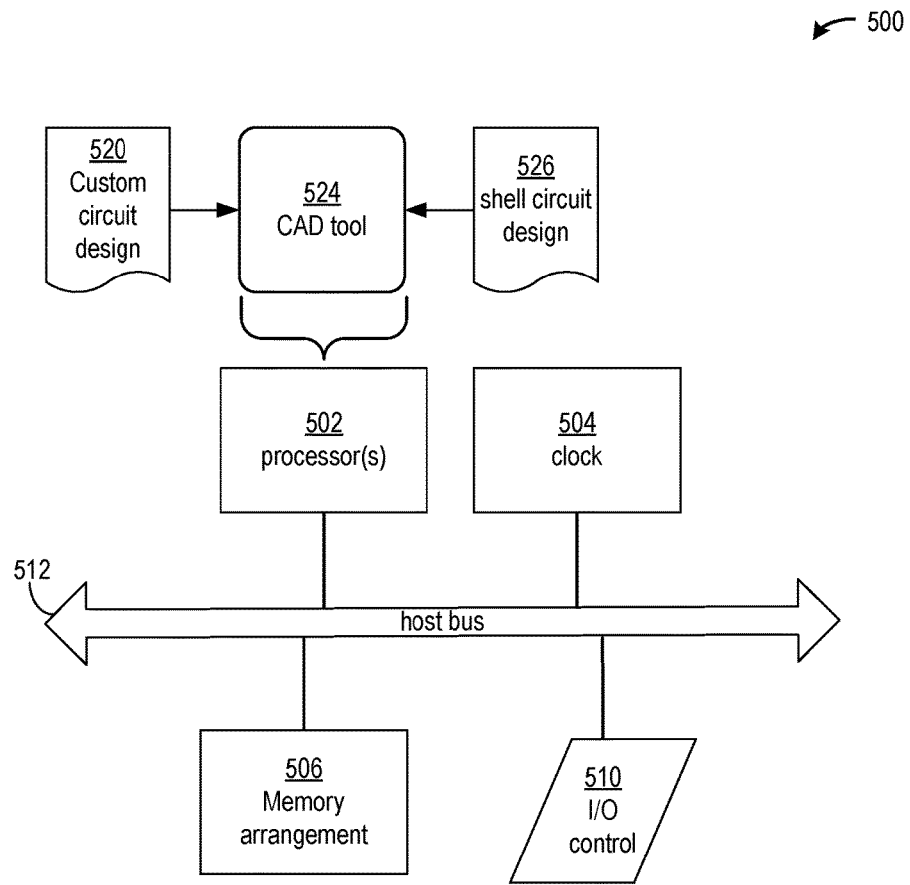
FIG. 5 shows a computing architecture that may be used to perform the disclosed processes.

FIG. 5 shows a block diagram of an example computing arrangement that may be configured to implement the data structures and processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 500 includes one or more processors 502, a clock signal generator 504, a memory arrangement 506, and an input/output control unit 510, all coupled to a host bus 512. The arrangement 500 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 502 may be one or more general purpose processors, or a combination of one or more general purpose processors and suitable co-processors, or one or more specialized processors (e.g., RISC, CISC, pipelined, etc.).

The memory arrangement 506 typically includes multiple levels of cache memory, and a main memory. The memory arrangement 506 may include local and/or remote persistent storage, such as provided by magnetic disks (not shown), flash, EPROM, or other non-volatile data storage. The memory arrangement 506 may be read or read/write capable.

The processor(s) 502 executes the software in the memory arrangement 506, reads data from and stores data to the memory arrangement 506, and communicates with external devices through the input/output control arrangement 510. These functions are synchronized by the clock signal generator 504. The resources of the computing arrangement may be managed by either an operating system (not shown), or a hardware control unit (not shown).

In some implementations, the memory arrangement 506 stores a set of instructions that, when executed, cause the processor 502 to provide a computer assisted design (CAD) tool 524. The CAD tool 524 may provide a graphical user interface (GUI) configured to aid in the design, simulation and/or testing of circuit designs (e.g., custom circuit design 520 and shell circuit design 526). In some implementations, the CAD tool 524 may be configured to automatically retrieve a shell circuit design 526 for a programmable IC (e.g. from a library) in response to a user selecting the programmable IC as a target device for implementation of the custom circuit design 520. As previously described, the shell circuit design 526 is configured to provide an interface for communication of data between the custom circuit design 520 and the dedicated hardware circuits available on the target programmable IC. The CAD tool 524 may be configured to place and route the custom circuit design 520 for implementation alongside the shell circuit design 526 on programmable resources of the target programmable IC. As described with reference to FIGS. 1-4, the CAD tool 524 may be configured to prune the shell circuit design 526, prior to placement and routing, to remove objects that do not affect operation of the custom circuit design 520 and thereby reduce computing resources required for placement and routing.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

Figure 6:
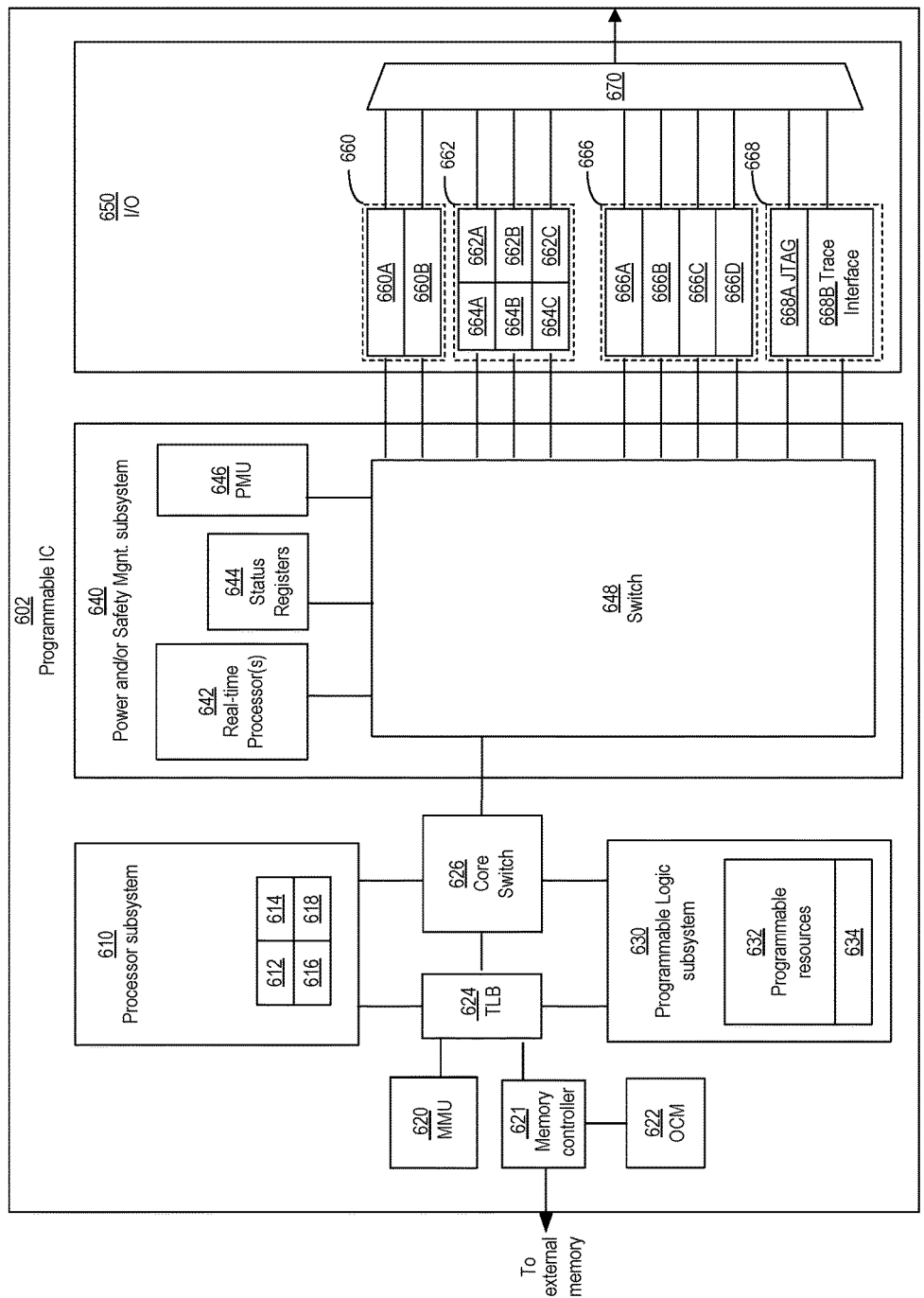
FIG. 6 shows an example programmable IC that may be configured in accordance with one or more implementations.

FIG. 6 shows a programmable IC 602 that may be configured in accordance with one or more implementations. The programmable IC may also be referred to as a System On Chip (SOC), which includes a processor subsystem 610 and a programmable logic subsystem 630. The processor subsystem 610 may be programmed to implement a software portion of the user design, via execution of a user program. The program may be specified as part of a configuration data stream or may be retrieved from an on-chip or off-chip data storage device. The processor subsystem 610 may include various circuits 612, 614, 616, and 618 for executing one or more software programs. The circuits 612, 614, 616, and 618 may include, for example, one or more processor cores, floating point units (FPUs), an interrupt processing unit, on chip-memory, memory caches, and/or cache coherent interconnect.

The programmable logic subsystem 630 of the programmable IC 602 may be programmed to implement a hardware portion of a user design. For instance, the programmable logic subsystem may include a number of programmable resources 632, which may be programmed to implement a set of circuits specified in a configuration data stream. The programmable resources 632 include programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 632 may be programmed by loading a configuration data stream into the configuration memory cells, which define how the programmable interconnect circuits and programmable logic circuits are configured. The collective states of the individual memory cells then determine the function of the programmable resources 632. The configuration data can be read from memory (e.g., from an external PROM) or written into the programmable IC 602 by an external device. In some implementations, configuration data may be loaded into configuration memory cells by a configuration controller 634 included in the programmable logic subsystem 630. In some other implementations, the configuration data may be loaded into the configuration memory cells by a start-up process executed by the processor subsystem 610.

The programmable IC 602 may include various circuits to interconnect the processor subsystem 610 with circuitry implemented within the programmable logic subsystem 630. In this example, the programmable IC 602 includes a core switch 626 that can route data signals between various data ports of the processor subsystem 610 and the programmable logic subsystem 630. The core switch 626 may also route data signals between either of the programmable logic or processing subsystems 610 and 630 and various other circuits of the programmable IC, such as an internal data bus. Alternatively or additionally, the processor subsystem 610 may include an interface to directly connect with the programmable logic subsystem—bypassing the core switch 626. Such an interface may be implemented, for example, using the AMBA AXI Protocol Specification (AXI) as published by ARM.

In some implementations, the processor subsystem 610 and the programmable logic subsystem 630 may also read or write to memory locations of an on-chip memory 622 or off-chip memory (not shown) via memory controller 621. The memory controller 621 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 621 is able to communicate is provided for purposes of illustration only and is not intended as a limitation or to be exhaustive. As shown in FIG. 6, the programmable IC 602 may include a memory management unit 620 and translation look-aside buffer 624 to translate virtual memory addresses used by the subsystems 610 and 630 to physical memory addresses used by the memory controller 621 to access specific memory locations.

The programmable IC may include an input/output (I/O) subsystem 650 for communication of data with external circuits. The I/O subsystem 650 may include various types of I/O devices or interfaces including for example, flash memory type I/O devices, higher performance I/O devices, lower performance interfaces, debugging I/O devices, and/or RAM I/O devices.

The I/O subsystem 650 may include one or more flash memory interfaces 660 illustrated as 660A and 660B. For example, one or more of flash memory interfaces 660 can be implemented as a Quad-Serial Peripheral Interface (QSPI) configured for 4-bit communication. One or more of flash memory interfaces 660 can be implemented as a parallel 8-bit NOR/SRAM type of interface. One or more of flash memory interfaces 660 can be implemented as a NAND interface configured for 8-bit and/or 16-bit communication. It should be appreciated that the particular interfaces described are provided for purposes of illustration and not limitation. Other interfaces having different bit widths can be used.

The I/O subsystem 650 can include one or more interfaces 662 providing a higher level of performance than flash memory interfaces 660. Each of interfaces 662A-662C can be coupled to a DMA controller 664A-664C respectively. For example, one or more of interfaces 662 can be implemented as a Universal Serial Bus (USB) type of interface. One or more of interfaces 662 can be implemented as a gigabit Ethernet type of interface. One or more of interfaces 662 can be implemented as a Secure Digital (SD) type of interface.

The I/O subsystem 650 may also include one or more interfaces 666 such as interfaces 666A-666D that provide a lower level of performance than interfaces 662. For example, one or more of interfaces 666 can be implemented as a General Purpose I/O (GPIO) type of interface. One or more of interfaces 666 can be implemented as a Universal Asynchronous Receiver/Transmitter (UART) type of interface. One or more of interfaces 666 can be implemented in the form of a Serial Peripheral Interface (SPI) bus type of interface. One or more of interfaces 666 can be implemented in the form of a Controller-Area-Network (CAN) type of interface and/or an $I^2C$ type of interface. One or more of interfaces 666 also can be implemented in the form of a timer type of interface.

The I/O subsystem 650 can include one or more debug interfaces 668 such as processor JTAG (PJTAG) interface 668A and a trace interface 668B. PJTAG interface 668A can provide an external debug interface for the programmable IC 602. Trace interface 668B can provide a port to receive debug, e.g., trace, information from the processor subsystem 610 or the programmable logic subsystem 630.

As shown, each of interfaces 660, 662, 666, and 668 can be coupled to a multiplexer 670. Multiplexer 670 provides a plurality of outputs that can be directly routed or coupled to external pins of the programmable IC 602, e.g., balls of the package within which the programmable IC 602 is disposed. For example, I/O pins of programmable IC 602 can be shared among interfaces 660, 662, 666, and 668. A user can configure multiplexer 670, via a configuration data stream to select which of interfaces 660-668 are to be used and, therefore, coupled to I/O pins of programmable IC 602 via multiplexer 670. The I/O subsystem 650, may also include a fabric multiplexer I/O (FMIO) interface (not shown) to connect interfaces 662-668 to programmable logic circuits of the programmable logic subsystem. Additionally or alternatively, the programmable logic subsystem 630 can be configured to implement one or more I/O circuits within programmable logic. In some implementations, the programmable IC 602 may also include a subsystem 640 having various circuits for power and/or safety management. For example, the subsystem 640 may include a power management unit 646 configured to monitor and maintain one or more voltage domains used to power the various subsystems of the programmable IC 602. In some implementations, the power management unit 646 may disable power of individual subsystems, when idle, to reduce power consumption, without disabling power to subsystems in use.

The subsystem 640 may also include safety circuits to monitor the status of the subsystems to ensure correct operation. For instance, the subsystem 640 may include one or more real-time processors 642 configured to monitor the status of the various subsystems (e.g., as indicated in status registers 644). The real-time processors 642 may be configured to perform a number of tasks in response to detecting errors. For example, for some errors, the real-time processors 642 may generate an alert in response to detecting an error. As another example, the real-time processors 642 may reset a subsystem to attempt to restore the subsystem to correct operation. The subsystem 640 includes a switch network 648 that may be used to interconnect various subsystems. For example, the switch network 648 may be configured to connect the various subsystems 610, 630, and 640 to various interfaces of the I/O subsystem 650. In some applications, the switch network 648 may also be used to isolate the real-time processors 642 from the subsystems that are to be monitored. Such isolation may be required by certain application standards (e.g., IEC-61508 SIL3 or ISO-26262 standards) to ensure that the real-time processors 642 are not affected by errors that occur in other subsystems.

The methods and systems are thought to be applicable to a variety of applications and IC architectures. Other aspects and features will be apparent to those skilled in the art from consideration of the specification. For example, though aspects and features may in some cases be described in individual figures, it will be appreciated that features from one figure can be combined with features of another figure even though the combination is not explicitly shown or explicitly described as a combination. It is intended that the specification and drawings be considered as examples only, with a true scope of the invention being indicated by the following claims.

What is claimed is:

1. A method, comprising performing on a processor circuit operations including:
    storing a representation of a circuit design in a memory circuit coupled to the processor circuit, wherein the circuit design specifies interactions with a set of dedicated hardware resources of an integrated circuit (IC) via a first shell circuit design that specifies an interface for communication between an implementation of the circuit design and the set of dedicated hardware resources;
    retrieving a set of timing constraints specified for one or more of a plurality of objects included in the first shell circuit design;
    identifying one or more objects of the first shell circuit design that do not affect timing of the circuit design;
    removing the identified objects from the first shell circuit design to produce a second shell circuit design in the memory circuit;
    placing and routing the circuit design according to timing constraints specified for objects of the first shell circuit design that are included in the second shell circuit design; and
    storing the placed and routed circuit design in the memory circuit.

2. The method of claim 1, wherein the identifying of the one or more objects includes:
    marking objects of the first shell circuit design that affect timing of the circuit design;
    determining a subset of objects of the first shell circuit design that are not marked; and
    identifying the one or more objects from the subset of objects.

3. The method of claim 2, wherein the identifying of the one or more objects further includes marking objects of the first shell circuit design having timing constraints.

4. The method of claim 3, wherein the marking of the objects of the first shell circuit design having timing constraints only marks objects that affect or interact with the circuit design.

5. The method of claim 2, wherein the identifying of the one or more objects further includes marking ports of the first shell circuit design included in a fan-in cone or a fan-out cone of the circuit design.

6. The method of claim 5, wherein the marking of the ports of the first shell circuit design included in a fan-in cone or a fan-out cone of the circuit design includes:
   for each input port of the circuit design, marking each port encountered in a backward breadth first search starting from the input port; and
   for each output port of the circuit design, marking each port encountered in a forward breadth first search starting from the output port.

7. The method of claim 6, further comprising in response to encountering a clocked circuit in the forward breadth first search starting from the output port, marking objects encountered in a backwards breadth first search starting from a clock input port of the clocked circuit.

8. The method of claim 2, wherein the identifying of the one or more objects includes marking constant ports in the first shell circuit design that affect timing of the circuit design.

9. The method of claim 8, wherein the marking of the constant ports in the first shell circuit design that affect timing of the circuit design includes:
   inspecting module instances of the first shell circuit design that have at least one port that is marked; and
   for each module instance that is inspected:
      identifying constant ports of the module instance; and
      in response to identifying a constant port in the module instance, marking ports in a fan-in cone of the identified constant port by performing a backward breadth first search starting from the identified constant port.

10. The method of claim 2, wherein the removing of the identified objects includes:
   traversing a hierarchy of module instances in the first shell circuit design in a top-down manner;
   for each module instance in the first shell circuit design encountered in the traversing of the hierarchy:
      removing unmarked ports of the module instance;
      in response to all ports of the module instance being removed, marking the module instance as a candidate for removal; and
      in response to less than all ports of the module instance being removed, marking the module instance and module instances that are ancestors to the module instance in the hierarchy as module instances to be retained; and
   after the traversing of the hierarchy, removing module instances marked as candidates for removal but not marked as module instances to be retained.

11. The method of claim 1, further comprising configuring programmable resources of the IC to implement the circuit design and the first shell circuit design; and
   wherein:
      the dedicated hardware resources include at least one communication circuit configured to communicate data with a peripheral device coupled to the IC,
      the first shell circuit design is placed and routed for implementation in a first portion of a set of programmable resources in the IC; and
      the placing and routing of the circuit design places and routes the circuit design for implementation in a second portion of the set of programmable resources.

12. A system for placement and routing of a circuit design, comprising:
   a processor circuit;
   a memory circuit coupled to the processor circuit; and
   wherein the memory circuit stores a set of instructions that, when executed by the processor circuit, cause the processor circuit to:
      store a representation of the circuit design in the memory circuit, wherein the circuit design is configured to interact with a set of dedicated hardware resources of an IC via a first shell circuit design configured to provide an interface for communication between the circuit design and the set of dedicated hardware resources;
      retrieve a set of timing constraints specified for one or more of a plurality of objects included in the first shell circuit design;
      identify one or more objects of the first shell circuit design that do not affect timing of the circuit design;
      remove the identified objects from the first shell circuit design to produce a second shell circuit design in the memory circuit;
      place and route the circuit design according to timing constraints specified for objects of the first shell circuit design that are included in the second shell circuit design; and
      store the placed and routed circuit design in the memory circuit.

13. The system of claim 12, wherein the set of instructions cause the processor circuit to, in the identifying of the one or more objects:
   mark objects of the first shell circuit design that affect timing of the circuit design;
   determine a subset of objects of the first shell circuit design that are not marked; and
   identify the one or more objects from the subset of objects.

14. The system of claim 13, wherein the processor circuit is configured to, in the identifying of the one or more objects, mark objects of the first shell circuit design having timing constraints.

15. The system of claim 14, wherein the processor circuit is configured to, in the marking of objects of the first shell circuit design having timing constraints, only mark objects that affect or interact with the circuit design.

16. The system of claim 13, wherein the set of instructions cause the processor circuit to, in the identifying of the one or more objects, mark ports of the first shell circuit design included in a fan-in cone or a fan-out cone of the circuit design.

17. The system of claim 16, wherein the processor circuit is configured to, in the marking of ports of the first shell circuit design included in a fan-in cone or a fan-out cone of the circuit design:
   for each input port of the circuit design, mark each port encountered in a backward breadth first search starting from the input port;
   for each output port of the circuit design, mark each port encountered in a forward breadth first search starting from the output port; and
   in response to encountering a clocked circuit in the forward breadth first search starting from the output port, mark objects encountered in a backwards breadth first search starting from a clock input port of the clocked circuit.

18. The system of claim 13, wherein the set of instructions cause the processor circuit to, in the identifying of the one or more objects, mark constant ports in the first shell circuit design that affect timing of the circuit design by performing operations including:
  inspecting module instances of the first shell circuit design that have at least one port that is marked; and
  for each module instance that is inspected:
    identifying constant ports of the module instance; and
    in response to identifying a constant port in the module instance, marking ports in a fan-in cone of the identified constant port by performing a backward breadth first search starting from the identified constant port.

19. The system of claim 13, wherein the set of instructions cause the processor circuit to, in the removing of the identified objects:
  traverse a hierarchy of module instances in the first shell circuit design in a top-down manner;
  for each module instance in the first shell circuit design encountered in the traversing of the hierarchy:
    remove unmarked ports of the module instance;
    in response to all ports of the module instance being removed, mark the module instance as a candidate for removal; and
    in response to less than all ports of the module instance being removed, mark the module instance and module instances that are ancestors to the module instance in the hierarchy as module instances to be retained; and
  after the traversing of the hierarchy, remove module instances marked as candidates for removal but not marked as module instances to be retained.

20. The system of claim 12, wherein:
the first shell circuit design is placed and routed for implementation in a first portion of a set of programmable resources in the IC;
the set of instructions further cause the IC to, in the placing and routing of the circuit design, place and route the circuit design for implementation in a second portion of the set of programmable resources; and
the dedicated hardware resources includes at least one communication circuit configured to communicate data with a peripheral device coupled to the IC.

\* \* \* \* \*